US006499393B2

(12) United States Patent
Waltman

(10) Patent No.: US 6,499,393 B2
(45) Date of Patent: Dec. 31, 2002

(54) PORTABLE BARBEQUE AND ROTISSERIE RACK

(76) Inventor: John H. Waltman, 3336 Bald Mountain Rd., Auburn Hills, MI (US) 48326

(*) Notice: Subject to any disclaimer, the term of this patent is extended or adjusted under 35 U.S.C. 154(b) by 0 days.

(21) Appl. No.: 09/847,695

(22) Filed: May 2, 2001

(65) Prior Publication Data

US 2002/0148361 A1 Oct. 17, 2002

Related U.S. Application Data

(60) Provisional application No. 60/283,234, filed on Apr. 11, 2001.

(51) Int. Cl.[7] ............................ A47J 43/18; A47J 37/04

(52) U.S. Cl. .............................. 99/426; 99/427; 99/449

(58) Field of Search .......................... 99/427, 426, 419, 99/421 R, 421 H, 449; 226/9 R, 9 B, 25 AA

(56) References Cited

U.S. PATENT DOCUMENTS 2,477,183 A 7/1949 Humensky ................ 99/421 H
2,787,948 A * 4/1957 Mathis ..................... 126/25 R
2,811,099 A 10/1957 McGoldrick ................. 99/444
2,938,450 A * 5/1960 Carpenter et al. ............ 99/427
3,163,103 A 12/1964 Shoup ......................... 99/427
3,342,122 A * 9/1967 Blinn ....................... 126/25 A
3,344,736 A 10/1967 Myler et al. .............. 99/421 H
4,436,024 A 3/1984 Arden et al. ........... 99/421 HV
4,442,762 A 4/1984 Beller ......................... 99/427
4,442,763 A 4/1984 Beller ......................... 99/427
4,593,613 A 6/1986 Waltman ..................... 99/427
4,625,634 A 12/1986 Krüper ........................ 99/427
4,688,477 A 8/1987 Waltman ..................... 99/427
5,632,098 A * 5/1997 Finch ....................... 99/421 H

* cited by examiner

*Primary Examiner*—Reginald L. Alexander
(74) *Attorney, Agent, or Firm*—Young & Basile, P.C.

(57) ABSTRACT

A portable barbeque and rotisserie rack is composed of components that can be easily assembled and disassembled into a small package for transporting from one location to another and adaptable for positioning over various types of sources of heat. The components include a frame having a base for placement over a source of heat and two end portions slidably and releasably connectible to the base. A pair of end walls are slidably connectible to the end portions. The frame is configured to hold a rotisserie cradle at an elevated position over the source of heat.

8 Claims, 2 Drawing Sheets

PORTABLE BARBEQUE AND ROTISSERIE RACK

This Application claims the benefit of U.S. Provisional Application No. 60/283,234, filed Apr. 11, 2001.

FIELD OF THE INVENTION

The present invention relates to a portable barbeque and rotisserie which can be easily disassembled for transporting thereof.

BACKGROUND OF THE INVENTION

In the prior art, food, such as meat, that is to be grilled is generally placed on a spit which is rotatable to expose the food to the heat in order to ensure uniform cooking of the same. In many applications, it is desirable to use the barbeque and rotisserie in association with an outdoor barbeque pit in which charcoal or wood is utilized as the means for heating the food. Since these applications can generally occur at different campground or picnic sites, it is desirable to provide a portable barbeque and rotisserie that can easily be transported from site to site. Many current rotisseries are cumbersome and difficult to transport. In addition, the current rotisseries occupy a large portion of cargo space needed for other camping equipment. Therefore it would be desirable to provide a rotisserie that can be easily assembled at each required site without the use of tools, and then can be easily disassembled into a small package for transporting.

SUMMARY OF THE INVENTION

The present invention addresses the aforementioned concerns.

The present invention provides a portable rotisserie having a frame with a center open portion for receiving a source of heat therein. The portable rotisserie includes a pair of end plates releasably and slidably connectible to the frame. The portable rotisserie further includes a cradle configured to be disposed between the pair of end plates, wherein the cradle has spindles extending from opposite ends of the cradle for placement on the frame.

In another aspect of the invention, the frame has a rectangular base with upwardly extending columns at each corner. The columns have exposed open ends. The frame has a pair of U-shape brackets, each including a pair of leg portions and a center crossover portion. The leg portions are insertable into the columns of the base.

In yet another aspect of the invention, the portable rotisserie further comprises an end plate releasably and slidably connectible to one of the U-shaped brackets.

In a further aspect of the invention, the end plate has integral curved side portions for slidable movement along the leg portions of the bracket. The end plate further has an integral, curved shoulder portion for hanging on said center crossover portion of the bracket.

Other applications of the present invention will become apparent to those skilled in the art when the following description of the best mode contemplated for practicing the invention is read in conjunction with the accompanying drawings.

DESCRIPTION OF THE PREFERRED EMBODIMENT

Figure 1:
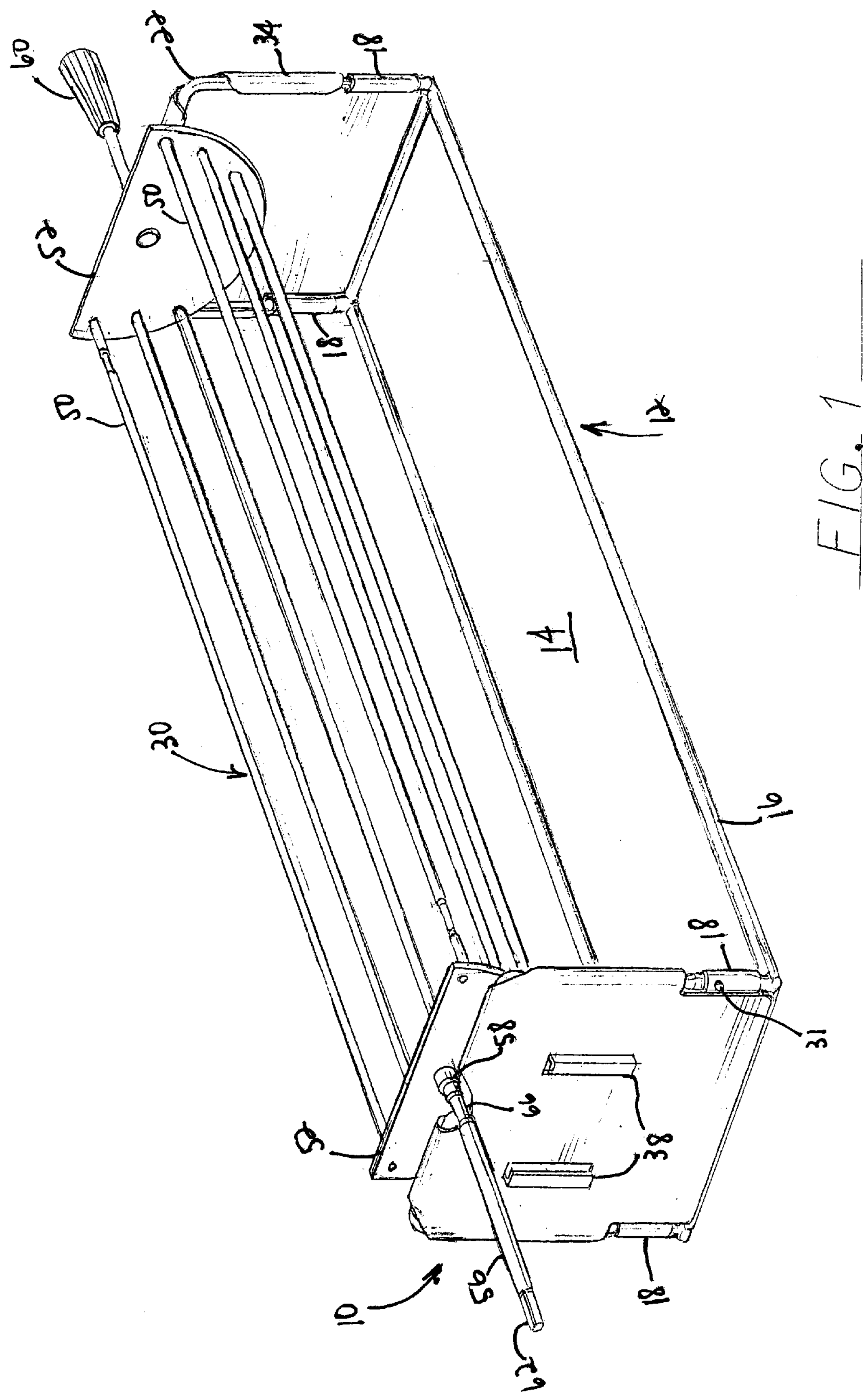
FIG. 1 is a perspective view of the present invention in the form of a portable barbeque and rotisserie, shown as assembled.
Figure 2:
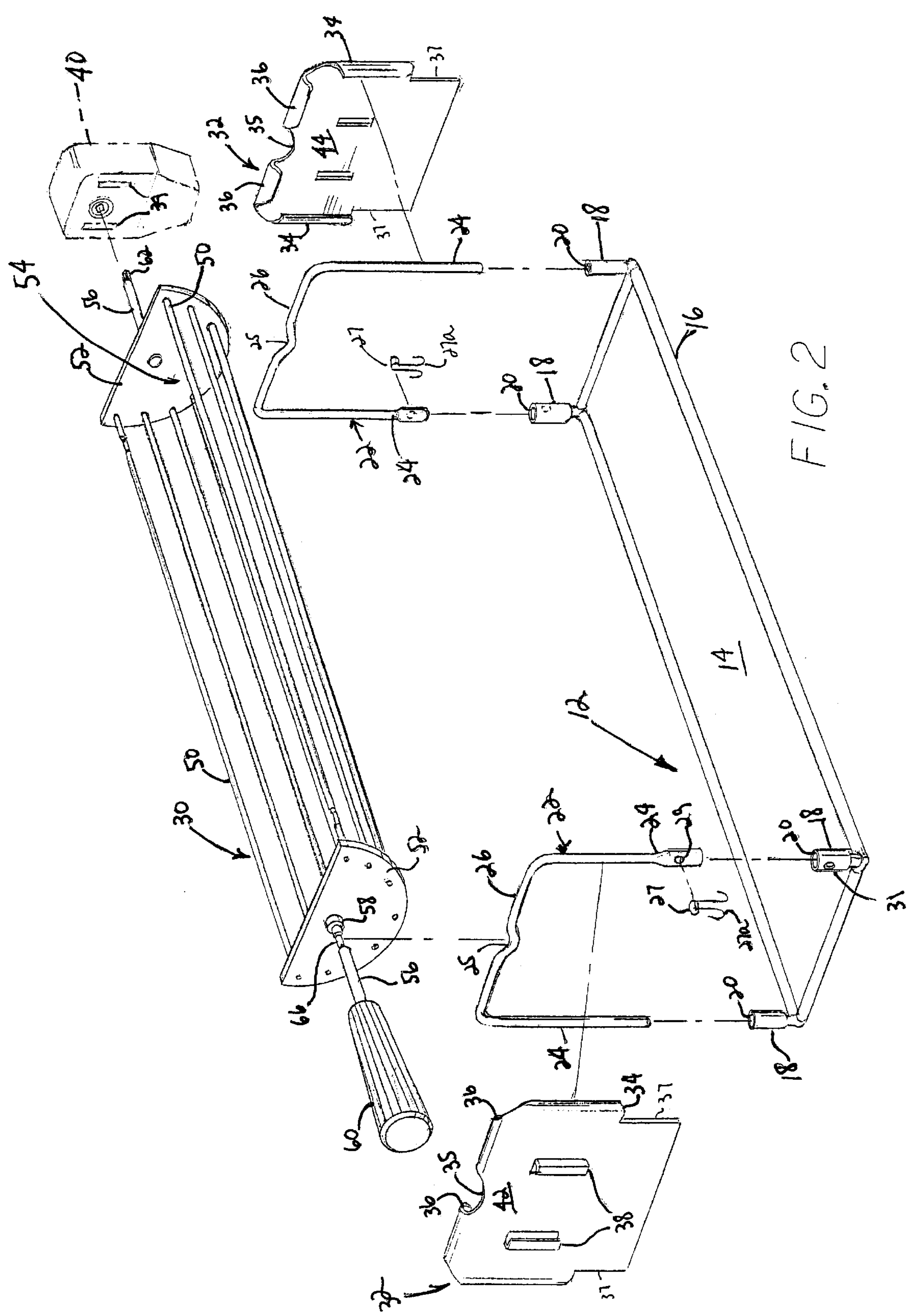
FIG. 2 is an exploded perspective of the portable barbeque and rotisserie, illustrated in FIG. 1.

Referring to FIGS. 1 and 2, there is illustrated an example of the present invention providing a portable barbeque and rotisserie rack 10. The portable rotisserie 10 comprises a frame 12 having a center open portion 14 for receiving a source of heat. In the illustrated embodiment, the frame 12 includes a rectangular base 16. Base 16 has upwardly extending columns 18 at each corner of the base 16. The columns 18 have open ends 20 for receiving another portion of the frame 12 as disclosed hereinafter. The frame 12 further includes a pair of U-shaped brackets 22, wherein each bracket includes a pair of leg portions 24 and a center crossover portion 26. The center crossover portion 26 has a center groove 25 formed therein for purposed discussed hereinafter. The leg portions 24 of the bracket 22 are configured for sliding within the open end 20 of columns 18 on the base 16. Each bracket 22 may include a locking means, which locks the bracket 22 into the base 16. As shown in FIG. 2, the locking means includes a spring loaded ball 27 extending from an aperture 29 located adjacent to the exposed ends of the leg portions 24. The spring loaded ball 27 is recessed into aperture 29 as the leg portion 24 is inserted into column 18. Column 18 may also include an aperture 31 sized and orientated to receive the spring loaded ball 27. Once the spring loaded ball 27 encounters aperture 31 in the column 18, the spring **27*a* biases the ball 27 through aperture 31 to lock the bracket 22 to the base 16. As shown in FIG. 2, the spring loaded ball 27 is located on only one leg portion 24 of each bracket 22. Further, in FIG. 2, apertures 31 are located in only two columns 18. It is evident that the spring loaded balls 27 and apertures 31 may be located in all of the leg portions 24 and columns 18 respectively. To remove the bracket 22 from the base 16, the spring loaded ball 27 is manually depressed into aperture 31 while the bracket 22 is lifted away from the base 16**.

Although the embodiment shown in FIGS. 1 and 2 shows cylindrically shaped frame members which form the base 12, bracket 22, and cradle 30, other configurations of the frame members are possible. The base 16 of the frame 12 provides a stable support on the ground or other horizontal surface, such as a stationary grille typically located at an outdoor campground. The U-shaped bracket 22 provides an elevated support for the rotisserie cradle 30.

The portable rotisserie further includes end plates 32 that are slidably connectible to the U-shaped brackets 22. A pair of end plates 32 are shown in FIGS. 1 and 2. It is possible to use the portable barbeque without the end plates 32 or with only one end plate 32 connected to one U-shaped bracket 22. However, it is preferred to install an end plate 32 on each U-shaped bracket 22 to provide added strength and stability to the brackets 22. The end plates 32 are configured to slidably mount onto one of the U-shaped brackets 22. The end plate 32 has integral side portions 34 that curve toward the inner surface 44 of the end plate 32. The integral curved side portions 34 are spaced from each other to accommodate the distance between the pair of leg portions 24 of the U-shaped bracket 22. The end plate 32 also has an integral shoulder portion 36 curved toward the inner surface 44 of the end plate 32 for hanging on the center crossover portion of the bracket 22. Each end plate 32 is cut and shaped from a single piece of sheet metal. The curved shoulder portion 36 acts as a stop for the end plate 32 to prevent the end plate 32 from sliding to the base 16 of the rotisserie. There are a pair of shoulder portions on each end plate with a center groove portion 35 disposed therebetween. Beneath the integral curved side portions 34, notches 37 are cut from the sides of the end plates 32 to accommodate space for the columns 18 when the end plates 32 are assembled onto the frame 12.

The end plate 32 further includes latching means for installing rotisserie accessories such as a motor 40 to the portable barbeque and rotisserie 10. The latching means 38 as shown in the figures includes a pair of parallel punched out tracks 38 on the end plates 32 which corresponds with rails 39 located on the rotisserie accessory 40. The rails 39 slidably mate into the tracks 38. The tracks 38 are exposed to the exterior surface 42 of the end plate 32. The embodiment shown in the figures of the latching means 38 or the rotisserie accessory 40 is only one configuration to be considered. Other considerations could include an extending horizontal ledge on the exterior surface 42 of the end plate 32 for receiving an extension from the rotisserie accessory 40. Other known hanging means or latching means are also contemplated.

For the rotisserie cradle, any grille basket, or cradle may be used with this portable barbeque that is sized for positioning between the U-shaped brackets 22. It is preferred that the cradle 30 will have a pair of longitudinally extending and circumferentially spaced rods 50 fixedly secured to side plates 52. A pair of adjacent rods 50 are circumferentially spaced from each other at sufficient distance to define a longitudinal opening 54 for the passage of food into the interior of the cradle 30. Extending from the exterior face of the side plates 52 are spindles 56. The spindles 56 may be secured to the appropriate plate 52 by means of a washer and a nut 58, or by similar means. It is preferred that one of the spindles 56 has a handle 60 attached at its exposed end, and the other spindle 56 will have an exposed end 62 configured for connecting to a corresponding portion of the rotisserie accessory 40. The spindle 56 may be configured to have a recessed portion 66 at a location such that each recessed portion 66 on each spindle 56 can be positioned within the center groove 25 of the crossover portion of the bracket 22 and also within the grooved portion 35 of end plates 32. This configuration helps to prevent the rotisserie cradle 30 from falling off the frame 12.

As shown in FIG. 2, the portable barbeque and rotisserie, according to the present invention, can be easily disassembled into a smaller package for transporting to a picnic or camping location. Upon assembly, the leg portions 24 of the U-shaped bracket 22 are snapped within the apertures 20 of the base 16. The end plates 32 are slidably connected over the U-shaped bracket 22. If a rotisserie accessory 40 is required, the latching means 39 on the accessory 40 can be positioned within the corresponding latching means 38 on the exterior face 42 of the end of plates 32. There are no screws or bolts required to connect the portable barbeque and rotisserie. Therefore, no tools are required for assembly.

After assembly, the rotisserie cradle 30 can be filled with the food product for cooking and then placed upon the U-shaped brackets 22. The frame 12 can be placed over any campfire, grille, or other generally horizontal surface having a heat source to cook the food.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A portable rotisserie comprising:

a frame having a center open-portion for receiving a source of heat therein;

a pair of end plates releasably and slidably connective to the frame;

a cradle configured to be disposed between the pair of end plates, said cradle having arms extending from opposite ends of the cradle for placement on the frame, wherein said frame has a rectangular base with upwardly extending columns at each corner, said columns having exposed open ends, and said frame has a pair of U-shaped brackets each including a pair of leg portions and a center crossover portion, wherein said leg portions are connectible to said columns.

2. The portable rotisserie of claim 1, wherein said leg portions are disposable within said columns.

3. The portable rotisserie of claim 1, further comprising an end plate releasably and slidably connectible to one of the U-shaped brackets.

4. The portable rotisserie of claim 3, wherein said end plate has integral curved side portions for slidable movement along said leg portions of said bracket.

5. The portable rotisserie of claim 3, wherein said end plate has an integral curved shoulder portion for hanging on said center crossover portion of said bracket.

6. The portable rotisserie of claim 3, wherein said end plate has an interior face and an exterior face, and wherein said exterior face has a pair of slidable connection means adapted for receiving a rotisserie accessory.

7. The portable rotisserie of claim 1, wherein said center crossover portion includes a slight well formation for receiving a spindle of the cradle therein.

8. The portable rotisserie of claim 2, wherein at least one leg portion and column has a spring loaded locking means for releasably locking said leg portion in said column.

* * * * *